United States Patent [19]

Schmölz

[11] 4,302,983

[45] Dec. 1, 1981

[54] SINGLE-TOOTH GEARING

[75] Inventor: Hubert Schmölz, Nattheim, Fed. Rep. of Germany

[73] Assignee: Voith Getriebe KG, Fed. Rep. of Germany

[21] Appl. No.: 132,301

[22] Filed: Mar. 20, 1980

[30] Foreign Application Priority Data

Mar. 23, 1979 [DE] Fed. Rep. of Germany ....... 2911424

[51] Int. Cl.³ .................... F16H 21/44; F16H 25/18
[52] U.S. Cl. ......................................................... 74/104
[58] Field of Search .................. 74/99 R, 99 A, 104, 74/107

[56] References Cited

U.S. PATENT DOCUMENTS

| | | | |
|---|---|---|---|
| 854,418 | 5/1907 | Hall | 74/99 |
| 2,093,003 | 9/1937 | Bowman et al. | 137/636.1 |
| 2,152,551 | 3/1939 | Lieb et al. | 74/104 |
| 2,431,848 | 12/1947 | Van Meter | 74/107 |
| 3,264,893 | 8/1966 | Stott et al. | 74/104 |
| 4,047,383 | 9/1977 | Johnson et al. | 60/354 |

FOREIGN PATENT DOCUMENTS

| | | | |
|---|---|---|---|
| 2112536 | 10/1971 | Fed. Rep. of Germany | 74/104 |
| 2394723 | 2/1979 | France | 74/107 |
| 166318 | 7/1921 | United Kingdom | 74/107 |

*Primary Examiner*—Lawrence J. Staab
*Attorney, Agent, or Firm*—Ostrolenk, Faber, Gerb & Soffen

[57] ABSTRACT

A single-tooth gearing, suitable for use e.g. in a hydrodynamic torque converter, is disclosed. The gearing includes a reciprocating rod having a tooth gap and a gear wheel having a tooth for engaging the tooth gap. The flanks of the tooth gap are precisely perpendicular to the path of motion of the rod, while the corresponding flanks of the tooth are curved, preferably having the shape of circular cylinders. The front flank of the tooth has a radius of curvature larger than that of the rear flank of the tooth. At the point of the rod's motion at which the force between the front edge of the tooth and the corresponding flank of the tooth gap is a maximum, the point of contact between the front edge of the tooth and the corresponding tooth gap flank is located on a plane containing the axis of rotation of the gear wheel and perpendicular to the path of the rod's motion. The length of the tooth gap is preferably equal to the sum of the radii of curvature of the two flanks of the tooth. As a result of this design, the force between the rod and the tooth is essentially entirely parallel to the directon of the rod's motion, reducing wear on the gearing.

14 Claims, 2 Drawing Figures

SINGLE-TOOTH GEARING

BACKGROUND OF THE INVENTION

The present invention relates generally to a single-tooth gearing of the type used, for example, for the displacement of movable guide vanes in a hydrodynamic torque converter. Such a gearing is known from U.S. Pat. No. 2,093,003 and U.S. Pat. No. 4,047,383, FIG. 10. In the cited patents, within a reciprocating rod there is provided a recess in one edge of the rod, which can be referred to as a "tooth gap". The flanks of the tooth gap are flat and parallel to each other and are generally perpendicular to the direction of movement of the rod, i.e. the flank angle is zero degrees. A wheel intended for limited rotary motion has a single tooth for engaging the tooth gap, which tooth has the shape of a bolt the "tooth flanks" of which have surfaces that are cylindrical in shape.

The single-tooth gearing known from U.S. Pat. No. 4,047,383 serves to actuate the movable guide vanes of an adjustable hydrodynamic torque converter. Consequently, the maximum stroke of the rod can be relatively short and the maximum angle of swing of the gear can accordingly be as small as about 30° or less. This known construction has the disadvantage that the force-transmitting flanks slide on each other so that there is the danger of premature wear, which results in impermissible flank clearance. In other words, the play-free fit of the tooth in the tooth gap is lost with the passage of time. This danger is present in particular in applications involving the transmission of high forces, as in the case of use in a hydrodynamic torque converter.

In hydrodynamic torque converters it is also known, as shown in German Unexamined Application for Patent DT-OS No. 26 56 142, to provide an articulated connection. If this is done, however, the desired freedom from play and ease of movement can be obtained only at high expense. Furthermore, such a connection is difficult to mount in a torque converter, particularly if the latter is mounted in a gear housing. Finally, although it would be conceivable to use a known rack gearing with involute toothing, as suggested in German Pat. No. 883,379, such a gearing has the disadvantage that a component of force transverse to the rod results from the approximately 20° angle of engagement. This transverse force leads to a bending of the rod and thus to friction in the rod bearings.

SUMMARY OF THE INVENTION

The object of the present invention is to create a single-tooth gearing which is suitable for high forces and small strokes and which operates, insofar as possible, without wear and therefore remains free of play, being as easily movable as possible.

The invention makes use of the fact that in many applications of one-tooth gearings, forces of different magnitude in the two directions of action occur. This is true, for instance, when a one-tooth gearing is used to adjust the guide vanes of a hydrodynamic torque converter. As long as such a converter is filled with operating liquid and is in operation, only one of the two tooth flanks of the tooth will as a rule be acted on. This flank is referred to as the "front tooth flank". In this case, the one-tooth gearing must counteract the hydraulic forces which act on the movable guide vanes. The other tooth flank, called the "rear tooth flank," need only rarely transmit a force and if it must transmit force then it transmits only a small one. This could occur, for example, when the guide vanes are in the maximum open position or are displaced in the empty condition of the converter. Furthermore, the rear tooth flank is intended to ensure freedom from play of the single tooth gearing, for instance, in the event that oscillations occur.

According to the invention, the front tooth flank has a considerably larger flank radius than the rear tooth flank. Accordingly, the thickness of the tooth and therefore also the distance between the flanks of the tooth gap, become considerable. Unlike known gearings of this type, according to the invention only the front tooth flank and the front tooth gap flank are in the vicinity of the so-called principal transverse plane. The rear tooth flank is relatively far from the principal transverse plane, from which it is separated by the thickness of the tooth. In other words, the tooth gap is always asymmetrical relative to the principal transverse plane and cannot, in any condition of operation, come into a symmetrical position with respect thereto.

As a result of the invention, not only the Hertz pressure but also the frictional losses are substantially reduced at the place of engagement of the front tooth flank. The sliding movement of the front tooth flank on the tooth gap flank associated with it is reduced considerably, as it is replaced by a substantially rolling movement. As long as the tooth gap flank against which the front tooth flank rests lies in the principal transverse plane or the immediate vicinity thereof, then even, purely rolling motion takes place. Since, as already mentioned, the rear tooth flank is only under a slight load, the fact that this tooth flank travels with relatively extensive sliding on its tooth gap flank can readily be tolerated.

The tooth gap flanks are preferably now arranged precisely perpendicular to the direction of movement of the rod so that transverse forces do not occur. As a result, the front tooth flank as a whole is moved closer to the axis of rotation of the gear wheel than the rear tooth flank.

If during a phase of movement, i.e. during movement of the rod from one extreme position to the other, the force to be transmitted changes, it is then advantageous to develop the arrangement in such a manner that, as seen in the direction of the axis of rotation of the wheel, the point of contact between the front tooth flank and the tooth gap flank associated with it lies directly in the principal transverse plane upon the occurrence of the highest force to be transmitted.

Other objects and features the invention are shown in the accompanying drawings of an embodiment which is presently preferred. The drawings are described below. It is to be understood, however, that the invention is not limited to the precise arrangements and instrumentalities shown.

DETAILED DESCRIPTION OF THE INVENTION

Figure 1:
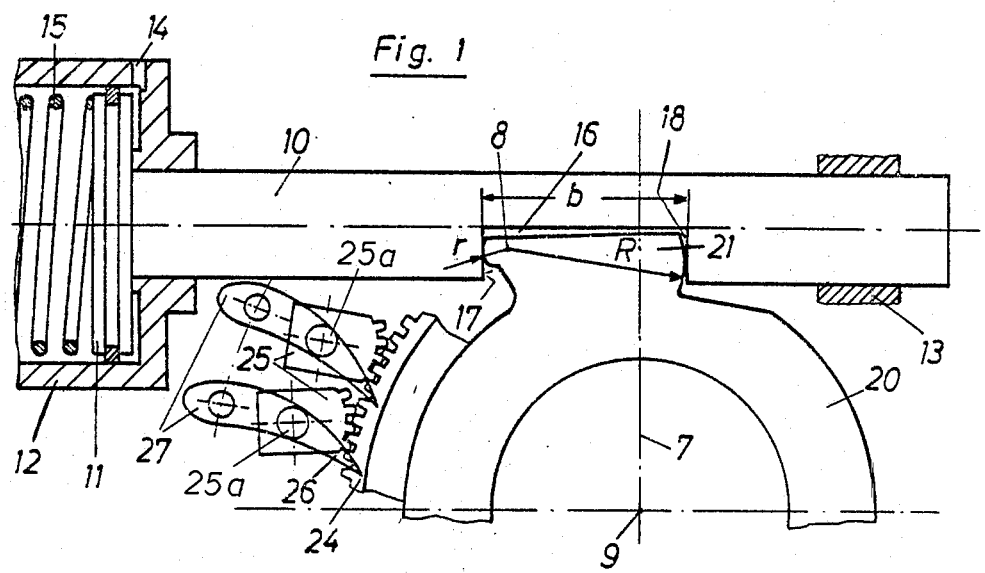
FIG. 1 shows a one-tooth gearing according to the invention for actuating movable vanes of a guide-vane ring of a hydrodynamic torque converter, wherein the gearing is shown in the normal position of the guide vanes, with the vane ring open.

The one-tooth gearing of the invention comprises an axially reciprocable rod 10 which is connected with the piston 11 of a single-acting hydraulic cylinder 12, only part of which is shown. The rod 10 is guided for such motion by the cylinder 12 and by a bearing 13 which is shown only diagrammatically. Pressure fluid, which is admitted to the cylinder 12 via the feed channel 14, acts on the piston 11 and moves the rod 10 toward the left in FIG. 1, against the force of a compression spring 15 disposed in cylinder 12.

The rod 10 has a rectangularly shaped tooth gap 16 in one edge. The axial flanks 17 and 18 of the tooth gap 16 are parallel to each other and are perpendicular to the axis of the rod 10.

A gear wheel 20 having a single tooth 21 engaging the tooth gap 16 is supported for limited rotation around an axis of rotation 9. (The means of support is not shown.) The tooth 21 has circular-cylindrical tooth flanks 22 and 23, which have a common axis of curvature 8.

The front tooth flank 22 of the tooth 21, which is in contact with the tooth gap flank 18, is subjected to a force when the piston 11 is urged to the left by pressure fluid in cylinder 12, which turns the gear 20 counter-clockwise. The gear 20 includes a toothed gear rim 24 around its periphery. Several toothed gear segments 25 engage the teeth of the gear rim 24 and are rotated thereby about the respective fixed pivots 25a of the gear segments. The gear segments are in turn fixed to the rear or free end portions 26 of the vanes 27 and the vanes 27 are articulated at the pivots 25a so that the rear end portions thereof may pivot with the gear segments 25. The gear segments 25 displace the rear end portion 26 of the vanes 27 of a vane ring which ring, for instance, forms part of a hydrodynamic torque converter. In such a converter, hydraulic forces act on the guide vanes during operation, doing so as a rule in the "opening" direction. These forces must be counteracted by the single-tooth gearing. To accomplish this, a large force must be transmitted at the place of engagement of the front tooth flank 22. This force is larger the closer the vane ring approaches the closed position. The load on the rear flank 23 is accordingly slight, as stated above.

It was found necessary to discard the previously customary, generally bolt-shape of the tooth. Only the regions of the tooth which actually transmit force, namely the flanks, are cylindrically curved, according to the invention. The radius of curvature of the force transmitting front tooth flank has been increased several times, while the size of the radius of curvature of the rear tooth flank has been left substantially unchanged. In this way, despite the considerably increased tooth thickness and despite the correspondingly increased width of the tooth gap, it is possible to retain the dimensions of the rod substantially unchanged. If the radii of both tooth flanks had been increased to make them equal as in the prior art, then it would have been necessary to increase the cross-section of the rod in the region of the tooth gap in order to make the radius of the front tooth flank large enough, which would have resulted in an excessive expenditure of material and space.

The flank radius R of the front tooth flank 22 is made several times greater than the flank radius r of the rear tooth flank 23. In order for the tooth 21 to fit, free of play, in all positions in the tooth gap 16, the sum of the two different flank radii R and r must be equal to the distance b between the tooth gap flanks 17 and 18.

During the reciprocating movement of the rod 10, the front tooth flank 22 and the corresponding tooth gap flank 18 are always in the vicinity of a plane indicated by the broken line 7 which extends through the axis of rotation 9 of the gear wheel 20 and is perpendicular to the axis of the rod 10. Plane 7 is the so-called principal transverse plane. The rear flank 23 and the corresponding tooth gap flank 17 lie relatively far from the principal transverse plane 7. Since the force to be transmitted via the front tooth flank 22 changes during the opening or closing of the vane ring, the tooth gap flank 18 lies at least approximately in the principal transverse plane 7 upon the occurrence of the largest force between rod 10 and tooth 21. This condition occurs approximately at the position shown in FIG. 2, with the vane ring nearly closed.

The tooth 21 is asymmetrical not only with respect to the different flank radii R and r but also in that the average distance d of the front tooth flank 22 from the axis of rotation 9 is less than the average distance e of the rear tooth flank 23 from the axis of rotation 9.

Figure 2:
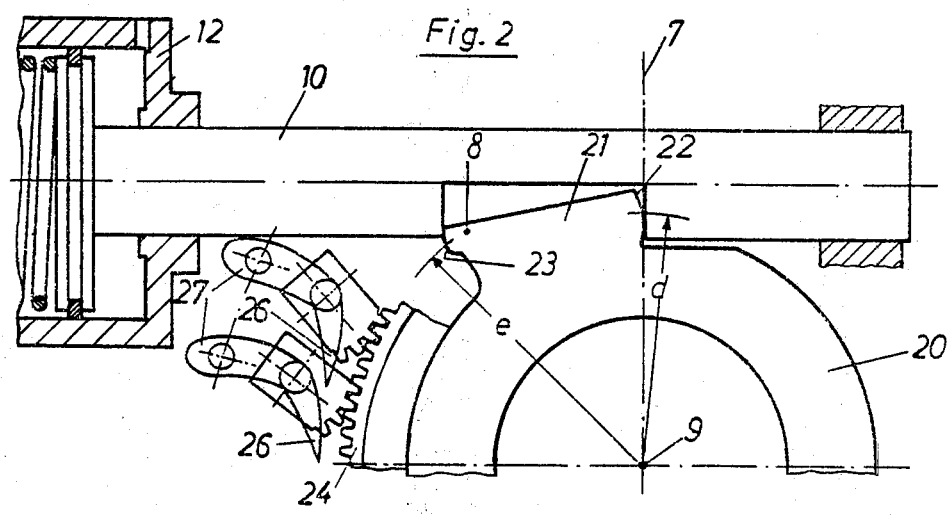
FIG. 2 shows the one-tooth gearing of FIG. 1 in the position in which the vane ring is closed.

In FIG. 2, the rod 10 has nearly completed the stroke whose beginning is shown in FIG. 1. The front tooth flank radius R, as shown, is about four times greater than the length of the stroke. But other dimensional ratios are also possible. The radius R can be from 3 to 10 times the maximum stroke of the rod 10. The radius r of the rear tooth flank 23 is approximately of the order of magnitude of the maximum stroke of the rod 10. In the example shown, the radius r is only about half as large as the maximum stroke. It can be seen that the distance b between the tooth gap flanks 17 and 18 is about 0.7 times the distance between the axis of the rod 10 and the axis of rotation 9 of the gear 20. Variations are possible, however, and this dimensional ratio could, for instance, have any value between 0.5 and 0.9.

Although a preferred embodiment of the invention has been described in detail, many modifications and variations thereof will now be apparent to one skilled in the art. Accordingly, the scope of the present invention is to be limited not by the details of the preferred embodiment herein described but only by the terms of the appended claims.

What is claimed is:

1. A single-tooth gearing, comprising:
   a rod for reciprocating motion, having a tooth gap in one side thereof, said tooth gap having first and second flanks spaced along said rod from each other and perpendicular to the reciprocating path of motion of said rod; and
   a gear wheel mounted for rotation about an axis of rotation generally perpendicular to said reciprocating path of motion of said rod, said gear wheel having a tooth thereon having a first and a second convexly curved tooth flank for engaging said first and second flanks of said tooth gap, respectively, said first tooth flank having a radius of curvature greater than that of said second tooth flank, the distance between said tooth gap flanks is equal to the sum of their said radii of curvature.

2. The gearing of claim 1, wherein said axis of rotation is perpendicular to said path of motion of said rod, and wherein the point of contact between said first tooth flank and said first tooth gap flank varies in distance from a plane containing said axis of rotation and perpendicular to said path of motion of said rod, said point of contact always being relatively near said plane, and the point of contact between said second tooth flank and said second tooth gap flank being relatively distant from said plane.

3. The gearing of claim 2, wherein the force between said first tooth flank and said first tooth gap flank varies with the position the said rod along its said path of motion, and wherein said point of contact between said first tooth flank and said first tooth gap flank is in said plane when said force is greatest.

4. The gearing of any of claims 1, 2 or 3, wherein said first and second tooth flanks have the shape of portions of respective circular cylinders.

5. The gearing of claim 1, wherein the sum of said radii of curvature is between 0.6 and 0.9 times the greatest distance between said axis of rotation and any point on said tooth.

6. The gearing of any of claims 1, 2 or 5, wherein said radius of curvature of said first tooth flank is between 3 and 10 times the length of said path of motion of said rod.

7. The gearing of claim 6, wherein said radius of curvature of said second tooth flank is of the same order of magnitude as the length of said path of motion of said rod.

8. The gearing of any of claims 1, 2 or 5, wherein the average distance of said first tooth flank from said axis of rotation is less than the average distance of said second tooth flank from said axis of rotation.

9. The gearing of claim 2, wherein said radius of curvature of said first tooth flank is between 6 and 20 times said length of said path.

10. A single-tooth gearing, comprising:

a rod for reciprocating motion, having a tooth gap in one side thereof, said tooth gap having first and second flanks spaced along said rod from each other and perpendicular to the reciprocating path of motion of said rod; and a gear wheel mounted for rotation about an axis of rotation perpendicular to said reciprocating path of motion of said rod, said gear wheel having a tooth thereon having a first and a second convexly curved tooth flank for engaging said first and second flanks of said tooth gap, respectively, said first tooth flank having a radius of curvature greater than that of said second tooth flank, the point of contact between said first tooth flank and said first tooth gap flank varies in distance from a plane containing said axis of rotation and perpendicular to said path of motion of said rod, said point of contact always being relatively near said plane, and the point of contact between said second tooth flank and said second tooth gap flank being relatively distant from said plane.

11. The gearing of claim 10, wherein said first and second tooth flanks have the shape of portions of respective circular cylinders.

12. The gearing of claim 10, wherein the sum of said radii of curvature is between 0.6 and 0.9 times the greatest distance between said axis of rotation and any point on said tooth.

13. The gearing of claim 10, wherein said radius of curvature of said first tooth flank is between 3 and 10 times the length of said path of motion of said rod.

14. The gearing of claim 13, wherein said radius of curvature of said second tooth flank is of the same order of magnitude as the length of said path of motion of said rod.

* * * * *